United States Patent
Balsdon

(10) Patent No.: US 6,739,573 B1
(45) Date of Patent: May 25, 2004

(54) CANISTER PURGE VALVE NOISE ATTENUATION

(75) Inventor: David Balsdon, Chatham (CA)

(73) Assignee: Siemens Canada Limited (CA)

( * ) Notice: Subject to any disclaimer, the term of this patent is extended or adjusted under 35 U.S.C. 154(b) by 0 days.

(21) Appl. No.: 09/698,082

(22) Filed: Oct. 30, 2000

Related U.S. Application Data

(60) Provisional application No. 60/161,956, filed on Oct. 28, 1999.

(51) Int. Cl.[7] .......................... F16K 31/02; H01F 3/00; H01F 7/08
(52) U.S. Cl. ................. 251/129.05; 335/257; 335/271; 335/276
(58) Field of Search ............................... 335/251, 257, 335/271, 277; 251/129.05, 129.15

(56) References Cited

U.S. PATENT DOCUMENTS

| | | | |
|---|---|---|---|
| 3,510,814 A | * | 5/1970 | Nordfors |
| 4,449,691 A | | 5/1984 | Führer et al. .................. 251/85 |
| 5,318,157 A | * | 6/1994 | Kempf ........................ 188/299 |
| 5,413,082 A | * | 5/1995 | Cook et al. .................. 123/520 |
| 5,503,366 A | | 4/1996 | Zabeck et al. .......... 251/129.18 |
| 5,524,593 A | | 6/1996 | Denne et al. ................ 123/520 |
| 5,579,741 A | | 12/1996 | Cook et al. |
| 5,663,700 A | * | 9/1997 | Spence ........................ 335/257 |
| 5,955,934 A | * | 9/1999 | Raj ............................ 335/277 |
| 5,967,487 A | | 10/1999 | Cook et al. |
| 5,984,268 A | * | 11/1999 | Doust ......................... 251/175 |
| 6,065,734 A | * | 5/2000 | Tackett et al. .......... 251/129.02 |
| 6,193,212 B1 | * | 2/2001 | Ohmi et al. .............. 251/129.16 |
| 6,293,516 B1 | * | 9/2001 | Parsons et al. .......... 251/129.04 |
| 6,305,662 B1 | * | 10/2001 | Parsons et al. .......... 251/129.04 |

FOREIGN PATENT DOCUMENTS

| | | |
|---|---|---|
| CH | 426 413 | 12/1966 |
| DE | 1 169 242 | 4/1964 |
| FR | 2 773 865 | 7/1999 |
| GB | 1 213 925 | 11/1970 |

* cited by examiner

Primary Examiner—Kevin Shaver
Assistant Examiner—David A Bonderer

(57) ABSTRACT

A valve assembly and method for regulating a fluid flow and attenuating noise. The valve assembly comprises a body having a passage extending between a first port and a second port, a seat defining a portion of the passage, a member movable with respect to the seat, an actuator moving the member from the first configuration to the second configuration, and a damper movable with respect to the actuator and located at a radial gap between the member and the actuator. The member moves generally along an axis between a first configuration prohibiting fluid flow through the seat and a second configuration permitting fluid flow through the seat. The member includes a first portion adapted to sealingly engage the seat in the first configuration, and a second portion extending along the axis between a first section that is distal from the first portion and a second section that is fixed to the first portion. The actuator has an aperture extending along the axis and generally receiving the second portion. The aperture includes a first segment generally guiding movement of the first section, and a second segment generally guiding movement of the second section.

14 Claims, 5 Drawing Sheets

CANISTER PURGE VALVE NOISE ATTENUATION

CROSS REFERENCE TO CO-PENDING APPLICATIONS

This application claims the benefit of the earlier filing date of U.S. Provisional Application No. 60/161,956, filed Oct. 28 ,1999, the disclosure of which is incorporated by reference herein in its entirety.

FIELD OF THE INVENTION

This invention relates generally to on-board emission control systems for internal combustion engine powered motor vehicles, e.g., evaporative emission control systems, and more particularly to an emission control valve, such as a canister purge solenoid (CPS) valve for an evaporative emission control system.

It is believed that a known on-board evaporative emission control system comprises a vapor collection canister that collects fuel vapor emitted from a tank containing volatile liquid fuel for the engine, and a CPS valve for periodically purging collected vapor to an intake manifold of the engine. It is believed that, in a known evaporative system control system, the CPS valve comprises a solenoid that is under the control of a purge control signal generated by a microprocessor-based engine management system. It is believed that a known purge control signal is a duty-cycle modulated square-pulse waveform having a relatively low operating frequency, e.g., in the 5 Hz to 20 Hz range. It is believed that the modulation may range from 0% to 100%. This means that for each cycle of the operating frequency, the solenoid is energized for a certain percentage of the time period of the cycle. It is believed that as this percentage increases, the time for which the solenoid is energized also increases, and therefore so does the purge flow through the valve. Conversely, it is also believed that the purge flow decreases as the percentage decreases.

During the "on" time of the duty cycle, an armature of the solenoid travels full stroke. During the "off" time of the duty cycle, the armature is returned to its normal position under the bias of a spring engaging the armature. Movement of the armature by the duty-cycle modulated square-pulse wave creates a pulsating noise level that is believed to be unacceptable to users of the valve.

SUMMARY OF THE INVENTION

The present invention provides a valve assembly for regulating a fluid flow. The valve assembly comprises a body having a passage extending between a first port and a second port, a seat defining a portion of the passage, a member movable with respect to the seat, an actuator moving the member from the first configuration to the second configuration, and a damper movable with respect to the actuator and located at a radial gap between the member and the actuator. The member moves generally along an axis between a first configuration prohibiting fluid flow through the seat and a second configuration permitting fluid flow through the seat. The member includes a first portion adapted to sealingly engage the seat in the first configuration, and a second portion extending along the axis between a first section that is distal from the first portion and a second section that is fixed to the first portion. The actuator has an aperture extending along the axis and generally receiving the second portion. The aperture includes a first segment generally guiding movement of the first section, and a second segment generally guiding movement of the second section.

The present invention also provides a method of attenuating impact in a valve assembly for regulating a fluid flow. The valve includes a seat that defines a portion of a passage for the fluid flow, a valve movable along an axis with respect to the seat, and an actuator that moves the valve between a first configuration that prohibits the fluid flow through the seat and a second configuration that permits the fluid flow through the seat. The method comprises installing a damper movable with respect to the actuator and located at a radial gap between the valve and the actuator.

The present invention further provides a method of regulating a fluid flow with a valve. The valve includes a seat that defines a portion of a passage for the fluid flow, a valve movable along an axis with respect to the seat, and an actuator that moves the valve between a first configuration that prohibits the fluid flow through the seat and a second configuration that permits the fluid flow through the seat. The method comprises operating the actuator with a pulse-width modulated signal, and generating no more than 35 decibels of sound at an ambient temperature of approximately 20 degrees Celsius.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DETAILED DESCRIPTION OF THE PREFERRED EMBODIMENTS

Figure 1:
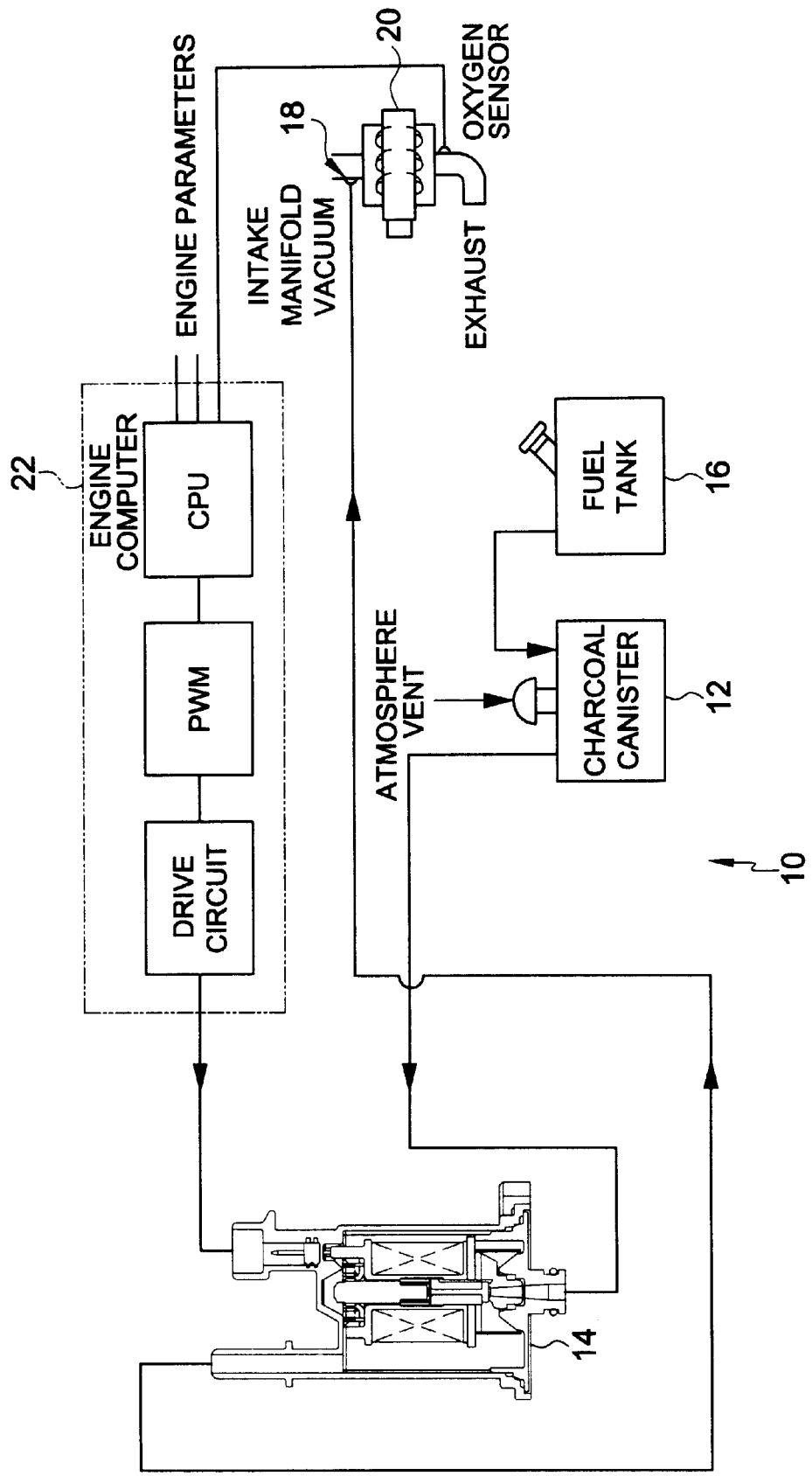
FIG. 1 is a schematic diagram of an evaporative emission control system including a CPS valve.

FIG. 1 shows an evaporative emission control system 10, such as for a motor vehicle (not shown), that comprises a vapor collection canister 12, and a CPS valve 14 according to the present disclosure. The valve 14 is connected in series between a fuel tank 16 and an intake manifold 18 of an internal combustion engine 20. An engine management computer 22 that receives various input signals supplies a purge control output signal for operating valve 14.

Figure 2:
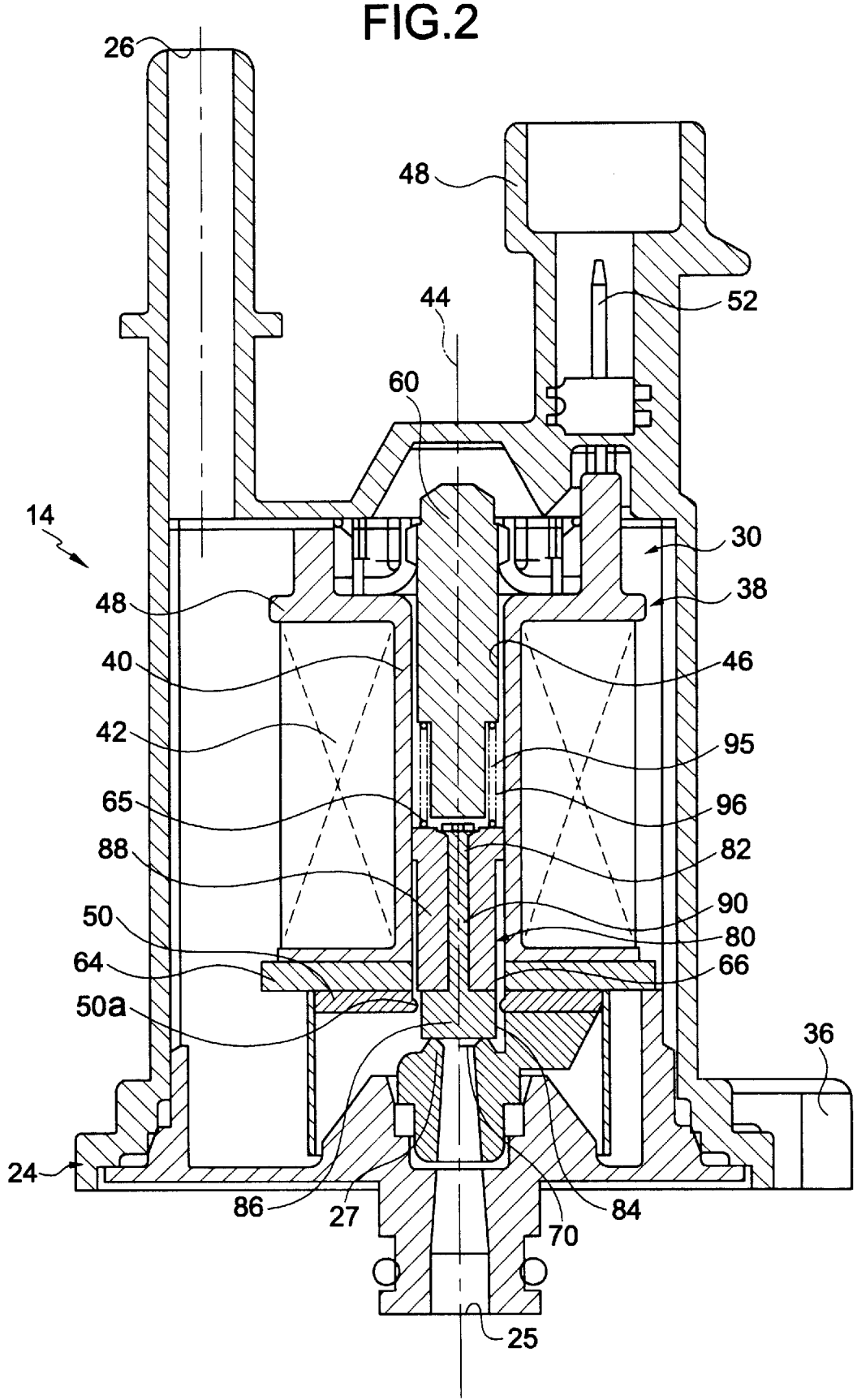
FIG. 2 is a cross-section view of a first embodiment of a CPS valve.

Referring to FIG. 2, the valve 14 comprises a body part 24 having an inlet port 25 and an outlet port 26. Body part 24 is fabricated from suitable fuel-tolerant material, such as by injection molding, and embodies the two ports as respective nipples. Body part 24 includes a formation 36 that provides for the mounting of the valve 14 at a suitable mounting location on an automotive vehicle, e.g., on the vapor collection canister 12. The body part 24 includes a passage 27 extending between the inlet and outlet ports 25,26. A seat 28 defines a portion of the passage 27.

Valve 14 further comprises a solenoid assembly 30 that is housed within body part 24. Solenoid assembly 30 comprises a polymeric bobbin 38 around whose central tubular core 40 an electromagnetic coil 42 is disposed. Reference numeral 44 designates an imaginary longitudinal axis of valve 14 with which core 40 and inlet port 25 are coaxial. Core 40 comprises a circular cylindrical aperture 46 that is open at opposite axial ends through respective radially directed annular end walls 48,50 of bobbin 38. Terminations of magnet wire that forms coil 42 are joined to respective electric terminals 52 (only one is shown) whose proximal ends are mounted in an electrical connector formation 48. Thus, the valve 14 is provided with an electric connector for making connection to a complementary connector (not shown) leading to the engine management computer 22.

Solenoid assembly 30 further comprises magnetic circuit structure for concentrating magnetic flux generated by coil 40 when electric current is delivered to the coil 42 via terminals 52. The magnetic circuit structure comprises an armature 80, a stator 60, e.g., a generally cylindrical pole piece that is disposed at one end of the solenoid 30, and a flux return washer 64 that is disposed at the opposite end of the solenoid 30. The magnetic circuit includes a "working" axial air gap 65 between the stator 60 and the armature 80, and it also includes a "parasitic" radial gap 66 between armature 80 and the flux return washer 64.

A member 100 can comprise an armature 80 of a generally cylindrical shape adapted for axial motion within aperture 46. One portion of the armature 80 includes an axial end section 82 that is in juxtaposition to the stator 60. Member 100 also includes a valve portion 70 that sealingly engages the seat 27. The valve portion 70 moves between a first configuration prohibiting fluid flow through the seat 27 and a second configuration permitting fluid flow through the seat 27.

Figure 3:
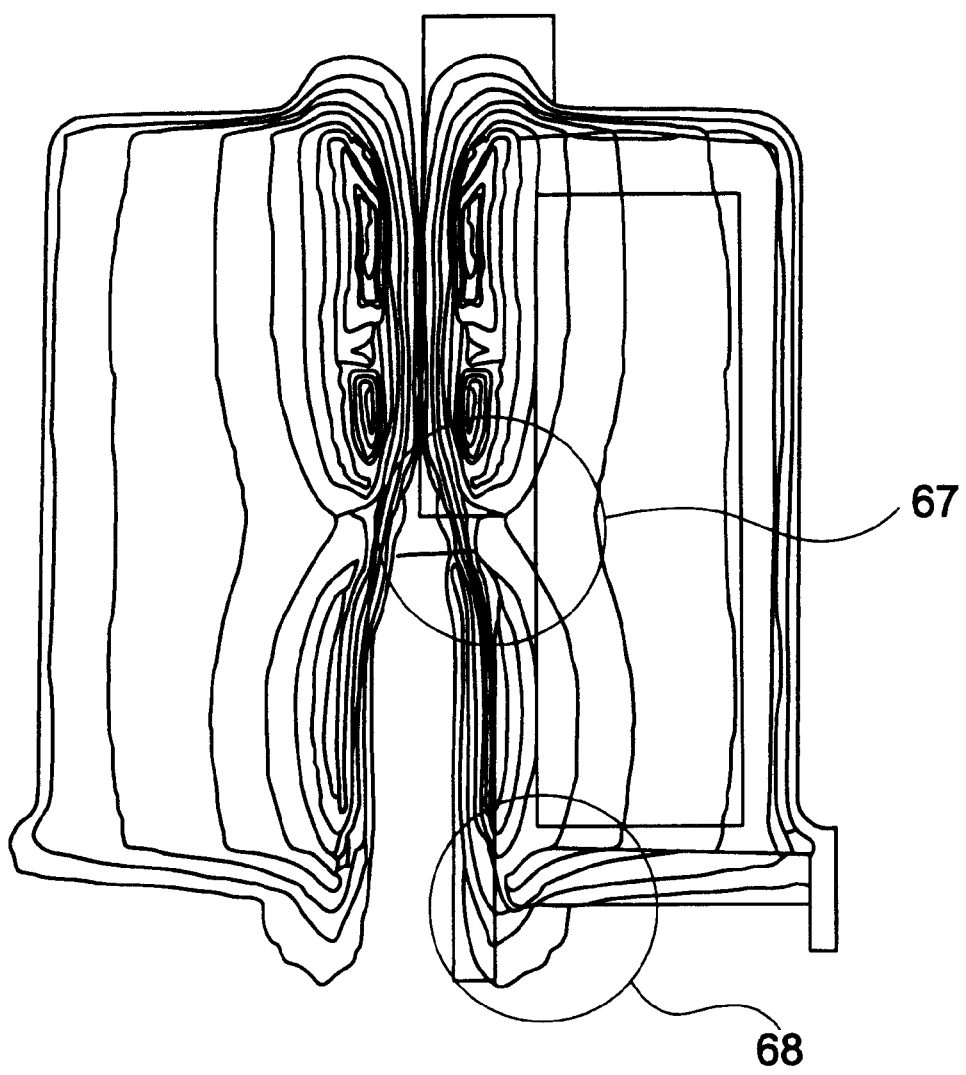
FIG. 3 is an illustration of magnetic flux lines in a CPS valve.

Referring also to FIG. 3, the magnetic flux lines that are generated are illustrated. When acted upon by magnetic force arising from magnetic flux in the magnetic circuit, armature 80 will not necessarily move with solely an axial component of motion. The motion may be accompanied by a radial, or lateral, component. The concentration of flux lines 67 that are generally parallel to the axis 44 extend across the working air gap 65 and provide the working force that pulls the armature 80 toward the stator 60. The flux lines 68, which are generally perpendicular to the axis 44, extend across the parasitic air gap 66 and tend to provide the undesirable lateral pull on the armature 80.

In order to dampen or attenuate undesired consequences, such as noise, which may result from such lateral motion, an impact absorbing resilient member 84 is provided at another section 86 of the armature 80. The illustrated impact absorbing resilient member 84 can be made of a fluorocarbon elastomer. One suitable material that is commercially available is vinylidene fluoride/hexafluoropropylene/tetrafluoroethylene terpolymers (sold as Viton GFLT by E. I. du Pont de Nemours & Co.).

The end wall 50 at a lower segment of the bobbin 38 may include a projection 50a extending into the radial parasitic air gap 66. The projection 50a contiguously engages the impact absorbing resilient member 84 as the armature 80 is moved laterally by the magnetic flux lines 68.

According to the illustrated embodiment, the section 82 of the armature 80 can comprise a ferrous jacket 88 surrounding an elastomer core, which can also form the section 86 of the armature 80. Thus, the resilient member 84 and the core can comprise a single homogeneous part. A third section 90 of the armature 80 is located between the sections 82,86. This third section 90 can include a reduced outside diameter portion of the ferrous jacket 88 surrounding the elastomer core. The reduced outside diameter of the third section 90 ensures that only the first section 82 of the armature 80 contacts a first segment 46a of the aperture 46, and the resilient member 84 only contacts the projection 50a at a second segment 46b of the aperture 46. Of course, it is also possible to provide the resilient member 84 with an enlarged diameter in lieu of or in addition to providing the projection 50a.

A spring 95 located in a pocket 96 formed by the stator 60 and the core 40 provides a return force to bias the armature 80 to its normal, i.e., closed configuration, position when the coil 42 is not energized.

The delivery of a purge control signal to valve 14 creates electric current flow in coil 42, and this current flow creates magnetic flux that is concentrated in the above-described magnetic circuit. As the current increases, increasing force is applied to armature 80 in the direction of increasingly displacing armature 80 away from seat 27. This force is countered by the increasing compression of spring 95.

Figure 4:
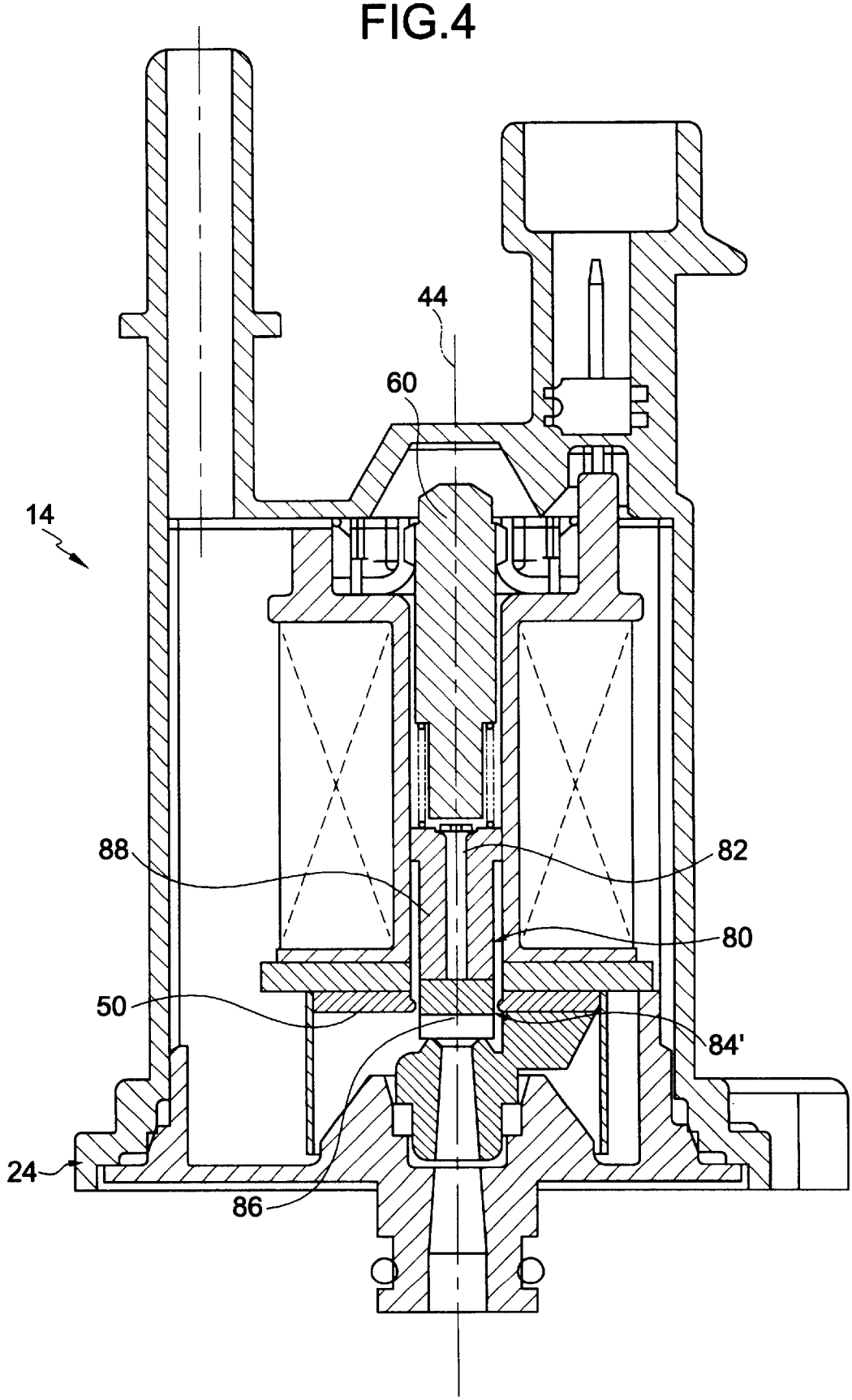
FIG. 4 is a cross-section view of a second embodiment of a CPS valve.

Referring to FIG. 4, a resilient element 84' can be alternatively formed as a band that surrounds the second section 86 of the armature 80. The resilient element 84' can be seated in a groove (not shown) that is formed on the exterior surface of the ferrous jacket 88. The resilient element 84' is positioned to be the first part of the armature 80 to contact the core 40, as the armature 80 is drawn laterally.

The resilient elements 84,84' act to dampen impacts between the armature 80 and the sides of the core 40. It is believed that by dampening these impacts, the noise level produced by the valve 14 during operation can be reduced. In tests, the noise level was reduced from 61.7 decibels to 39 decibels (at −20° Celsius) and was reduced from 47.5 decibels to 33.3 decibels (at +20° Celsius). The background noise during these tests was 26.5 decibels.

Figure 5:
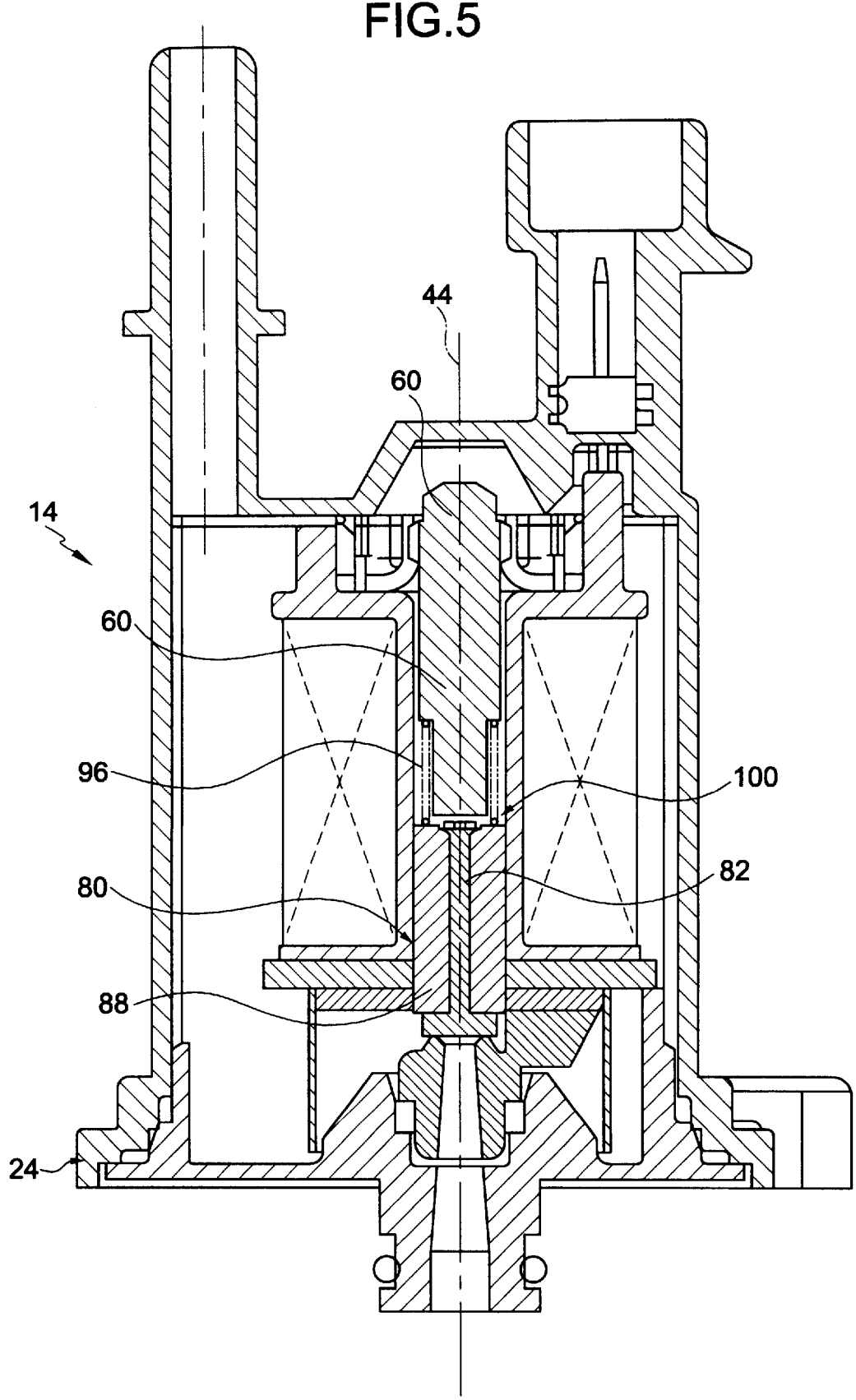
FIG. 5 is a cross-section view of a third embodiment of a CPS valve.

Referring to FIG. 5, a viscous fluid 100 can additionally or alternatively be placed in the radial gap defined by the pocket 96 and in the axial gap between the armature 80 and the stator 60. Examples of suitable viscous fluids include NYGEL 760G manufactured by NYE lubricants and Loctite Lubricant. A synthetic fluid, such as the Loctite Lubricant, is preferable for long-term exposure to petroleum vapors. The viscous fluid 100 allows the armature 80 to travel freely inside the aperture 46. The viscous fluid 100 also acts to dampen impacts between the armature 80 and the sides of the core 40, and between the armature 80 and the stator 60. It is believed that by dampening these impacts, the noise level produced by the valve 14 during operation can be reduced. In tests, the noise level was reduced from 61.7 decibels to 39 decibels (at −20° Celsius) and was reduced from 53 decibels to 32.9 decibels (at +20° Celsius). The background noise during these tests was 26.5 decibels.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A valve assembly for regulating a fluid flow, the valve assembly comprising:
    a body having a passage extending between a first port and a second port;

a seat defining a portion of the passage;
a member movable with respect to the seat, the member moving generally along an axis between a first configuration prohibiting fluid flow through the seat and a second configuration permitting fluid flow through the seat, the member including:
  a first portion adapted to sealingly engage the seat in the first configuration; and
  a second portion extending along the axis between a first section that is distal from the first portion and a second section that is proximate to the first portion;
an actuator moving the member from the first configuration to the second configuration, the actuator defining an aperture extending along the axis and generally receiving the second portion, the aperture being defined by:
  a first segment generally guiding movement of the first section; and
  a second segment generally guiding movement of the second section; and
a damper movable with respect to the actuator and located at a radial gap between the member and the actuator, the damper and the first portion being contiguously engaged and being defined by a single homogeneous part.

2. The valve assembly according to claim 1, wherein the damper comprises a resilient member located at the second section of the member.

3. The valve assembly according to claim 2, wherein the second segment of the aperture is defined by a projection into the radial gap, and the projection contiguously engages the resilient member as the member moves at least toward the second configuration.

4. The valve assembly according to claim 2, wherein the second portion of the member further includes a third section interposed along the axis between the first and second sections of the member, the third section of the member has a first cross-section that is transverse with respect to the axis, and the resilient member has a second cross-section that is transverse with respect to the axis, the second cross-section being larger than the, first cross-section.

5. The valve assembly according to claim 4, wherein the first section of the member has a third cross-section that it transverse with respect to the axis, the third cross-section being larger than the first cross-section.

6. The valve assembly according to claim 2, wherein the resilient member comprises a fluorocarbon elastomer material.

7. The valve assembly according to claim 1, wherein the damper comprises a viscous fluid in the radial gap.

8. The valve assembly according to claim 7, wherein the radial gap is between the first section of the member and actuator.

9. The valve assembly according to claim 8, further comprising:
  a biasing member disposed between the member and the actuator, the biasing member being located in a pocket and moving the member from the second configuration to the first configuration.

10. The valve assembly according to claim 9, wherein the viscous fluid is in the pocket and in an axial gap between the member and the actuator when the member is in the first configuration.

11. A valve assembly for regulating a fluid flow, the valve assembly comprising:
  a body having a passage extending between a first port and a second port;
  a seat defining a portion of the passage;
  a member movable with respect to the seat, the member moving generally along an axis between a first configuration prohibiting fluid flow through the seat and a second configuration permitting fluid flow through the seat, the member including:
    a first portion adapted to sealingly engage the seat in the first configuration; and
    a second portion extending along the axis between a first section that is distal from the first portion and a second section that is proximate to the first portion, the first section of the member including a ferrous jacket surrounding a fluorocarbon elastomer core that includes a piece of the second section of the member;
  an actuator moving the member from the first configuration to the second configuration, the actuator including an electromagnet and defining an aperture extending along the axis and generally receiving the second portion, the aperture being defined by:
    a first segment generally guiding movement of the first section; and
    a second segment generally guiding movement of the second section; and
  a damper movable with respect to the actuator and located at a radial gap between the member and the actuator, the damper includes a resilient member located at the second section of the member, the resilient member includes a fluorocarbon elastomer material, and the resilient member and the core include a single homogeneous part.

12. The valve assembly according to claim 11, wherein the actuator further comprises a ferrous stator on the axis and a ferrous washer interposed along the axis between the first and second segments of the aperture, and wherein the electromagnet produces lines of magnetic flux as the member moves toward the second configuration, the lines of magnetic flux include:
  a first set of the lines extending generally parallel to the axis between the jacket and the stator; and
  a second set of the lines extending generally radial to the axis between the second section of the member and the washer.

13. The valve assembly according to claim 12, wherein the second set of lines pass through at least the resilient member.

14. A valve assembly for regulating a fluid flow, the valve assembly comprising:
  a body having a passage extending between a first port and a second port;
  a seat defining a portion of the passage;
  a member movable with respect to the seat, the member moving generally along an axis between a first configuration prohibiting fluid flow through the seat and a second configuration permitting fluid flow through the seat, the member including:
    a first portion adapted to sealingly engage the seat in the first configuration; and
    a second portion extending along the axis between a first section that is distal from the first portion and a second section that is proximate to the first portion;
  an actuator moving the member from the first configuration to the second configuration, the actuator defining an aperture extending along the axis and generally receiving the second portion, the aperture being defined by:

a first segment generally guiding movement of the first section; and a second segment generally guiding movement of the second section; and a damper movable with respect to the actuator and located at a radial gap between the member and the actuator, the damper and the first portion including a single homogeneous part, wherein the damper comprises a viscous fluid in the radial gap and the viscous fluid comprises a damping grease.

* * * * *